Figure 1:
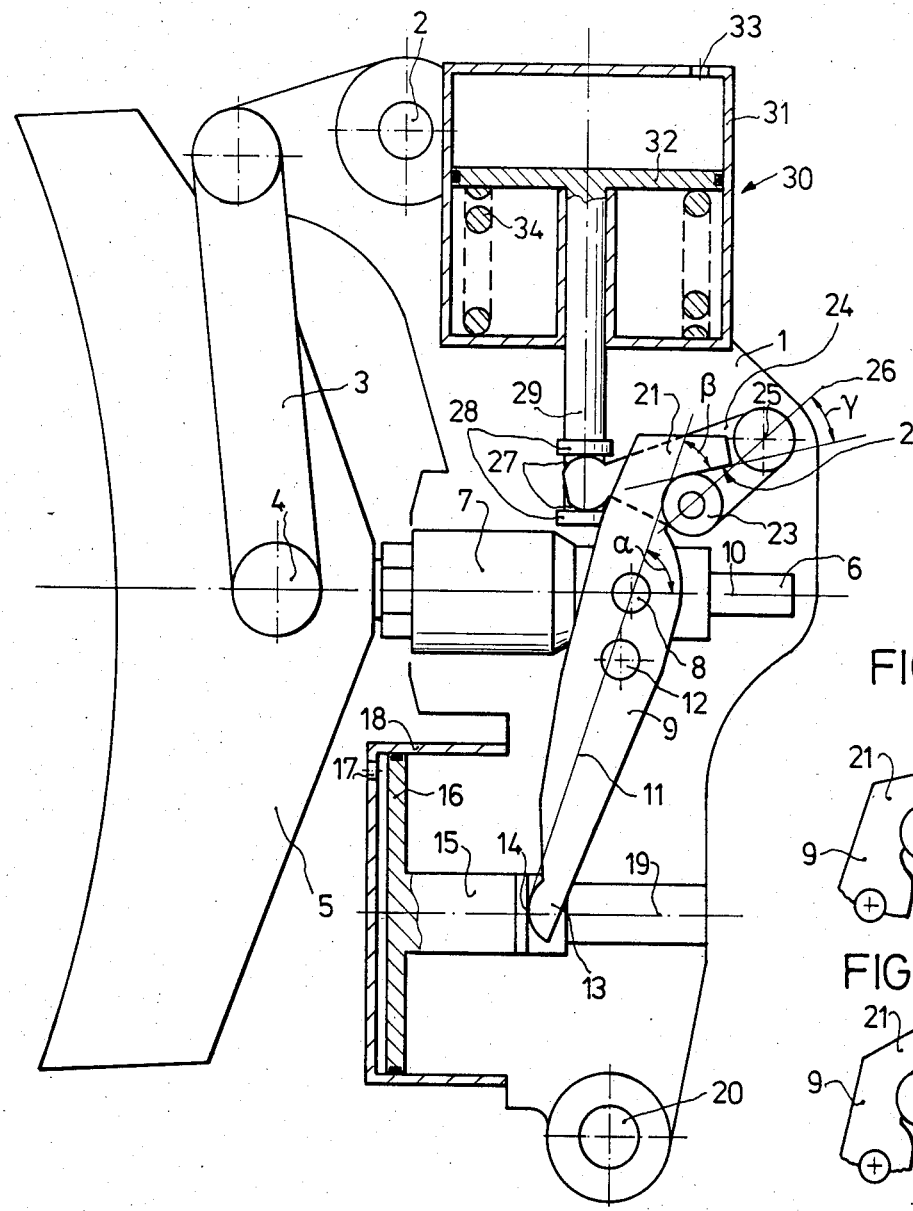

United States Patent [19]

Staltmeir et al.

[11] Patent Number: 4,607,729

[45] Date of Patent: Aug. 26, 1986

[54] BRAKE UNIT FOR RAIL VEHICLES

[75] Inventors: Josef Staltmeir; Bernd Wosegien, both of Munich, Fed. Rep. of Germany

[73] Assignee: Knorr-Bremse AG, Munich, Fed. Rep. of Germany

[21] Appl. No.: 679,683

[22] Filed: Dec. 10, 1984

[30] Foreign Application Priority Data

Dec. 9, 1983 [DE] Fed. Rep. of Germany ....... 3344616

[51] Int. Cl.$^4$ .............................. B60T 11/10
[52] U.S. Cl. ................................ 188/153 R; 188/107; 188/106 F
[58] Field of Search ............... 188/107, 170, 106 P, 188/106 F, 105, 72.9, 153 R, 106 R, 74, 52

[56] References Cited

U.S. PATENT DOCUMENTS 2,531,055 11/1950 Kirk ..................................... 188/107
2,940,553 6/1960 Newell et al. ................... 188/153 R

FOREIGN PATENT DOCUMENTS 2659768 7/1978 Fed. Rep. of Germany ... 188/153 R

Primary Examiner—George E. A. Halvosa
Assistant Examiner—Matthew C. Graham
Attorney, Agent, or Firm—Edmund M. Jaskiewicz

[57] ABSTRACT

The block brake unit for rail vehicles has a service brake which includes a transmission lever which is pivoted by a brake piston to shift an actuating rod coupled with a brake block carrier. A parking brake includes a spring-loaded cylinder which is coupled by a pivotable parking brake lever through a transmission lever to the actuating rod. An impact wedge coupling comprising a roller and wedge surface is provided between the parking brake lever and the transmission lever. By a suitable choice of the inclination and shape of the wedge surface, the transmission ratio for the parking brake can be readily adjusted for requirements in particular situations without the necessity for changes of the exterior dimensions or mounts and without any changes of the transmission ratio for the service brake. The wedge surface can also be constructed to provide a constant progressive or decreasing transmission ratio and also a fast application for the parking brake.

5 Claims, 3 Drawing Figures

U.S. Patent  Aug. 26, 1986  4,607,729

BRAKE UNIT FOR RAIL VEHICLES

The present invention relates to a block brake unit for rail vehicles, more particularly, to the structure for determining the effective transmission ratio within broad limits of a parking brake in such a brake unit.

One form of a block brake unit for rail vehicles has a brake piston actuated by a fluid pressure medium and which is coupled by at least a transmission lever to an actuating rod for the block brake member to apply the brake. Such a brake unit also includes a parking brake device which can be actuated mechanically, such as by a spring loaded by a fluid pressure medium. The parking brake device further includes a parking brake lever which is operatively connected with the transmission lever by an impact coupling.

One such block brake unit is disclosed in D.E.-A.S. No. 11 60 488. In that structure, the transmission lever is disposed at substantially right angles to the actuating rod and the brake cylinder containing the brake piston has its axial direction extending substantially parallel to the actuating rod and the parking brake lever approximately in the extension of the transmission lever. The parking brake lever has a pan-shaped impact coupling which can apply a load upon a point between the transmission lever and the brake piston. The parking brake lever is pivotably mounted in its central portion on the brake unit housing and its other end is provided with an eye for pivoting of a parking brake rigging. The parking brake lever is smaller than the transmission lever and is disposed essentially parallel to the transmission lever and adjacent thereto. As a result, the block brake unit requires a relatively large overall height. It might be suggested that the parking brake rigging may be constructed as a spring-loaded brake cylinder which would be pivotably connected to the free eye of the parking brake lever.

A basic disadvantage of this known block brake unit is that the lever-transmission ratios both for service braking by actuation of the brake piston by a pressure medium and for parking brakings are established by the construction. However, in practice and under operating conditions, variations of these transmission ratios are often required. The transmission ratio of the transmission lever can be determined by the required force of the brake block of the brake piston when one considers the size of the brake system and the available pressure of the pressure medium. This transmission ratio can then be multiplied by the transmission ratio of the parking brake lever and is introduced into the rigging transmission ratio for the parking brake. Thus, considering the force available in each case for actuating the parking brake using, for example, a spring-loaded brake cylinder, a parking pressure for the brake block can be calculated and this parking pressure must be sufficient for these specific requirements of the vehicle. It is apparent that parking brake levers with different transmission ratios can be used to obtain mutual adjustment of the transmission ratios for service and parking braking operations. However, since neither the position of the impact coupling nor the location of the pivot mount of the parking brake lever can be easily varied, any variation of the connection for the parking brake rigging or the positioning of the spring-loaded brake cylinder would necessarily result in changes in the connection dimensions, and this, of course, would produce complications and difficulties in assembly of the unit.

In D.E. - A.S. No. 22 54 090, there is disclosed a brake unit for disk brakes in which a brake piston and a spring piston are arranged in opposition to each other and act by means of a common impact coupling on one end of a transmission lever. This structure has the disadvantage that it is not at all possible to determine the lever transmission ratios for the service brake and parking brake independently of each other.

In U.S. Pat. No. 1,760,624, there is disclosed a servo brake device wherein a piston is connected with an actuating rod by means of a wedge coupling including a pivotable lever wherein the transmission ratio of the wedge unit varies as a function of the travel.

It is therefore the principal object of the present invention to provide a novel and improved block brake unit for rail vehicles and the like having a fixed transmission ratio for the service brake and a selectively variable transmission ratio for the parking brake.

It is another object of the present invention to provide such a block brake unit for rail vehicles wherein the transmission ratio for the parking brake can be readily determined without the necessity for any external modifications of the brake unit structure and without any modifications in the mounting dimensions for the unit so that these dimensions remain within broad limit corresponding to the respective requirements.

The objects of the present invention are achieved and the disadvantages of the prior art are avoided by the present invention wherein an impact coupling is constructed as a wedge power transmission structure operating between the transmission lever and the parking brake lever. By appropriate selection of the slope of the wedge surface, it is thus possible to readily ascertain the transmission ratio of the wedge power transmission unit and therefore the effective transmission ratio for the parking brake within broad limits.

According to one aspect of the present invention, the block brake unit for rail vehicles and the like may comprise means including a transmission lever for operatively connecting the piston rod of a fluid pressure brake piston to the actuating rod of a block brake member. There is also provided means for defining the wedge impact coupling between a parking brake lever and the transmission lever.

The present invention also provides that the wedge impact coupling may have a transmission ratio that varies with its travel. Accordingly, by an appropriate change of transmission ratio as a function of the travel, it is possible to readily obtain a fast application of the brake and a compensation may be made for the actuating force of a spring which decreases with the travel and/or a progressive transmission with increasing operating force for the brake as a function of the travel.

Figure 2:
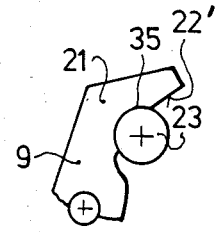
Figure 3:
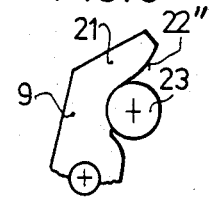

Other objects and advantages of the present invention will be apparent upon reference to the accompanying description when taken in conjunction with the following drawings, which are exemplary, wherein;

FIG. 1 is a vertical sectional view through a block brake unit according to the present invention; and FIGS. 2 and 3 are elevational views showing in detail the wedge impact coupling of FIG. 1 with variations in the shape of the wedge surface according to the present invention.

Proceeding next to the drawings, wherein like reference symbols indicate the same parts throughout the various views, a specific embodiment and modifications of the present invention will be described in detail.

As may be seen in FIG. 1, the block brake unit of the present invention has a housing 1 on the upper end of which there is provided a pivot mount for the housing consisting of an opening 2, and adjacent this pivot mount there is pivotably mounted a downwardly extending lever 3. The lower end of the pivotable lever 3 is connected by a pivotable connection 4 to a block brake carrier 5 from which extends an actuating rod 6.

The actuating rod 6 extends essentially horizontally and is provided with a slack adjustor device 7 as known in the art.

On a portion of the actuating rod 6, away from the block brake carrier 5, there is a pivotable connection 8 which connects to a transmission lever 9. The transmission lever 9 is arranged at substantially right angles to the actuating rod 6 and has a longitudinal axis or plane 11 which intersects the longitudinal axis 10 of the actuating rod as shown at an angle $\alpha$ of about 70° in the release condition of the block brake unit. Immediately under the pivot connection 8, the transmission lever 9 has a pivot connection 12 by means of which the lever 9 is pivotably mounted to the housing 1.

The transmission lever 9 has a lower end 13 which is coupled to a piston rod 15 of a brake piston 16 by an impact or abutment coupling 14. The brake piston 16 is slidably guided in a cylinder 18 which can be actuated by a fluid pressure medium by means of a pipe connection 17. The cylinder 18 is mounted on the housing 1.

The axial direction 19 of the brake cylinder 18 extends substantially horizontally in the embodiment of the block brake unit, however, in order to avoid any accumulation of water, it may be advantageous to locate the piston 18 in such a manner that its longitudinal axis 19 in the direction of withdrawal of the brake piston 16 is inclined at a slight angle to the horizontal of the order of about 10°. Immediately under the brake cylinder 18 there is provided a second pivotable mount 20 in the form of a bolt opening such that the housing 1 can be fastened to the frame of a rail vehicle by the two mounting points 2 and 20. However, when brake blocks are positioned on both sides of a wheel that is to be braked, the housing 1 can also be pivotably mounted to the frame of the rail vehicle at the mounting point 2 and a pull rod is pivotably connected at bearing mount 20, and extends across the vehicle wheel so as to be connected in the usual manner to a brake lever carrying a second brake block on the other side of the wheel.

The transmission lever 9 has an upper lever end 21 positioned above its pivot connection 8 and this upper lever end 21 is bent at an angle in a direction away from the brake piston 16. The underside of the lever end 21 which is directed toward the actuating rod 6 is provided with an inclined or wedge surface 22. A roller 23 is in contact with the wedge surface 20 and is pivotably mounted on a parking brake lever 24 that is partially overlapped by the lever end 21 as can be seen in the drawings. Accordingly, the wedge or inclined surface 22 and the roller 23, together define a wedge impact coupling or power transmission unit 22, 23.

Plane 11 from the transmission lever 9 passes at least approximately through the impact coupling 14, the pivotable mount 12, pivotable connection 8 and the point of contact of the roller 23 on the transmission lever 9. Plane 11 is disposed at an angle $\beta$ with respect to the wedge or cam surface 22 and this angle is about 60° to 80°. In plan view, the parking brake lever 24 has approximately the shape of an obtuse triangle and the roller 23 is positioned close to the obtuse angle of the triangular shape. The parking brake lever 24 is pivotably mounted to the housing 1 at a pivotable connection 25 which is located laterally of the free end 21 of the transmission lever slightly and slightly above the plane of the wedge surface 22. A plane 23 passing through the bearing connection 25 and the bearing connection of roller 23 will extend at an angle $\gamma$ of about 30° to the plane of the wedge surface 22.

In the region of the third angle of the triangularly shaped parking brake lever 24, there are provided opposed rounded bearing or contact surfaces 27 which are engageable between two flanges 28 of a pull rod 29 which extends at approximately a right angle to the actuating rod 6. The pull rod 29 is the piston rod of a spring-loaded cylinder 30 which is fixedly mounted on the housing 1. The spring-loaded cylinder 30 has a cylinder housing 31, connected to the housing 1, and in which is a piston 32 the upper surface of which is subjected to the pressure of a fluid pressure medium introduced through a line connection 33 in the cylinder housing 31 and on its lower surface is constantly loaded by the force exerted by a spring 34. The pull rod 29 is fixedly connected to the piston 32. This cylinder construction thus provides an arrangement in which spring 34 loads the parking brake lever 24 in a direction of rotation around its pivot connection 25 away from the actuating rod 6 and therefore in the direction of pressing the roller 23 against the wedge surface 22.

In a service braking operation wherein the brake piston 16 is actuated by a brake cylinder pressure achieved from the introduction of a fluid pressure medium into the cylinder 18, the block brake unit will function in the conventional manner wherein the brake piston 16 with piston rod 15 is displaced to the right as viewed in FIG. 1 so as to rotate transmission lever 9 counterclock-wise around its bearing mount 12. The transmission lever 9 is thus lifted from the roller 23 during this pivoting movement and urges the actuating rod 6 toward the left by means of the pivot connection 8, as a result of which a brake shoe (not shown) mounted on the carrier 5 is pressed against the peripheral edge of the vehicle wheel (also not shown) which is to be braked. As a result of a pressure medium supplied through line connection 33, the piston 32 is retained in its illustrated position which maintains the spring 34 under tension. Upon the subsequent release of the brake, the steps described above correspondingly occur in reverse.

In order to actuate the parking brake, the fluid pressure medium existing in the cylinder housing 31 is decreased through the line connection 33 such that the tension spring 34 will act to lift the piston 32. This causes pull rod 29 to pivot parking brake lever 24 clockwise around its pivot mount 25 by means of the flanges 28 acting upon the rounded contact surfaces 27. The roller 23 thus rolls along the wedge surface 22 and accordingly rotates transmission lever 9 counterclockwise around its pivot mount 12. This causes the impact coupling 14 to be disengaged so that the brake piston 16 remains in a rest position and actuating rod 6 is urged to the left by the pivot connection 8 as previously described above. During these pivoting movements of the parking brake lever 24 and the transmission lever 9, the direction of movement of the roller 23 and the position of wedge surface 22 will change with respect to each other such that the wedge impact coupling 22, 23 will undergo an increase in its transmission ratio. As a result of this increase of this transmission ratio, the force of spring 34 which has been reduced by a partial release of its tension is compensated and thus transmission lever 9 undergoes an independent approximately constant clockwise torque from the release of tension of the spring 34. In this manner, the parking brake can exert a parking brake force that is at least almost always constant regardless of the magnitude of the brake piston travel. However, it is respectfully pointed out that the wedge impact coupling can also be constructed in a modified manner as will be described below.

Thus, in this block brake unit, the transmission ratio of the transmission lever 9 determines the effective transmission ratio for the service brake actuated by brake piston 16, while the transmission ratio which is determined by the wedge impact coupling 22, 23 is effective for the parking brake device which is actuated by the spring-loaded cylinder 30. By varying the transmission ratio of the wedge impact coupling 22, 23, the effective transmission ratio for the parking brake device can be simply and readily adjusted to the requirements of particular situations, while at the same time the transmission ratio for the service brake remains constant. The transmission ratio of the wedge impact coupling 22, 23 can be simply established by a suitable selection of angle $\beta$. These different transmission ratios can thus be readily achieved by using in the block brake unit different transmission levers 9 which have different wedge surface angles $\beta$.

The transmission ratio of the wedge impact coupling 22, 23 can also be adjusted to a desired value merely by modifying the parking brake lever 24 and its position by shifting flanges 28 on the pull rod 29 with a corresponding adjusting of the position of the wedge surface 22. However, this modification is somewhat more costly than the modification described above. However, an advantage of this latter modification is that shifting of the flanges 28 on pull rod 29 adjusts the pre-tension of spring 34 so that springs having a wide range of spring forces or values can be used. In any event, it is essential that neither the adjustment of the transmission ratios of the wedge impact coupling 22, 23 nor adjustment of the force of spring 34 require any changes in the external dimension in the block brake unit and that particularly all dimensions with respect to mounting of the unit remain constant.

In another modification, it is not necessary to provide a spring-loaded cylinder 30 for actuation of the parking brake, but the pull rod 29 can extend outwardly of the block brake unit and be connected with the conventional hand or parking brake rigging that is located outwardly of the block brake unit. In such a construction which is somewhat similar to that described in D.E. - A.S. No. 11 60 488 which has been described above, connection dimensions that do not change the transmission ratio variation capability for the parking brake is particularly advantageous. Further, it is preferable that when either the service brake or parking brake is actuated, that the actuating elements belonging to the other brake remain inoperative by a lifting or disengagement of the impact coupling 14 or the wedge impact coupling 22, 23.

As generally described above, the utilization of a wedge or cam impact coupling in the rigging of the parking brake provides a wide number of possibilities within the scope of this invention. For example, it is not necessary that the wedge surface 22 be a plane or straight as illustrated in FIG. 1, but can have other shapes. FIGS. 2 and 3 thus illustrate the different modifications in which portions of the transmission lever 9 of roller 23 are illustrated.

In FIG. 2, a wedge surface 22' at lever end 21 can be provided with a recess 35 into which roller 23 drops in the release state of the block brake unit. When the parking brake is actuated, the roller 23, upon leaving its recess 35 initially causes a quick pivoting of transmission lever 9 by means of which a fast application of the brake is produced. As the roller 23 reaches the straight or plane section of the surface 22', the transmission lever 9 will continue to pivot but at a slower speed until the brake is firmly applied. With this modification, the impact coupling 22, 23 has a variation of transmission with an initially low and a subsequently high transmission ratio for initial fast application of the brakes and subsequently a powerful clamping or application. However, in this construction, care must be taken that in a service braking operation there is an unobstructed lifting of the lever end 21 with wedge surface 22' from the roller 23.

As may be seen in FIG. 3, the transmission lever end 21 may be provided with a wedge surface 22" which has an arch or arcuate shape such that the arch will perform a continuous variation of the transmission ratio of the wedge impact coupling 22", 23. In the convex arch of wedge surface 22", which is illustrated, an increasing transmission ratio is produced with travel and there is thus a progressive transmission which on the one hand can be used to compensate for the decrease of the spring force and on the other hand can be applied to obtain a progressive braking action. If required by particular circumstances, a progressively decreasing transmission ratio can be achieved by providing a concave arching of the wedge surface of the wedge impact coupling. It is also possible to compensate for the quick application of brakes obtained with FIG. 2 with a constant transmission variation according to FIG. 3 by a suitable shaping of the wedge surface.

As a further modification, the cylinder 18 and/or the spring-loaded cylinder 30 can be mounted in other positions on the housing 1. It is particularly advantageous to position these cylinders at slight inclinations, as discussed above for cylinder 18, in order to avoid any accumulation of water, also with respect to pivoting movements of the housing 1 about a pivotable mount 2 and/or to more effectively utilize the structural space. The parking brake lever 24 might be constructed in the form of an angular lever on one end of which the parking brake force is applied and on the other hand of which the roller 23 is mounted. For coupling or connecting to an outside braking or hand brake rigging, it is advantageous to arrange in approximately vertical position that portion of the parking brake lever for the introduction of the parking brake force, on which is provided the pivot connection, such that the usual outside parking or hand brake rigging which delivers a force in a substantially horizontal direction can be pivoted without further reversing requirements.

In another modification, the mounting of the wedge surface and roller with respect to the transmission lever 9 and parking brake lever 24 may be interchanged so that the roller is mounted on the transmission lever 9 and the wedge surface is provided on the parking brake lever 24. With this interchange of these components, all of the modifications described above are also possible. In addition, the incorporation of the impact wedge coupling in the parking brake device is possible not only in block brake units, but also in brake units for disk brakes in a corresponding manner.

Thus it can be seen that the present invention has provided an improved block brake unit wherein the transmission ratio for the parking brake may be easily and simply varied or adjusted while the service brake transmission ratio remains constant. Further, these variations or modifications in the transmission ratio can be carried out with a minimum of cost and expense and without modification of the housing itself so that mounting supports on a housing may remain the same while the housing accommodates various modifications of the block brake unit.

It will be understood that this invention is susceptible to modification in order to adapt it to different usages and conditions, and accordingly, it is desired to comprehend such modifications within this invention as may fall within the scope of the appended claims.

What is claimed is:

1. In a block brake unit for rail vehicles, a block brake member actuating rod, a fluid pressure brake piston having a piston rod, means including a transmission lever for operatively connecting said piston rod to said actuating rod, means for defining a mechanical parking brake device having a parking brake lever, and means for defining a wedge impact coupling between said parking brake lever and said transmission lever, said wedge impact coupling comprises a roller on one of said parking brake lever and said transmission lever and a wedge surface on the other of said parking brake lever and said transmission lever, said transmission lever comprising a first lever arm connected to said brake piston rod and a second lever arm engageable by said impact coupling, there being a pivotable mount for said transmission lever and a pivotable connection between said transmission lever and said brake piston rod, said pivotable mount and said pivotable connection being spaced from each other in the central portion of said transmission lever.

2. In a block brake unit as claimed in claim 1 wherein said parking brake lever has first and second ends and is shorter in length than said transmission lever, a pivotable mount on said first end of said parking brake lever, said roller being mounted on the central portion of said parking brake lever, said second end of said parking brake lever being connected to a pull rod from said parking brake device, said pull rod being disposed substantially at right angles to said actuating rod, said wedge surface being on said second lever arm of said transmission lever.

3. In a block brake unit, as claimed in claim 2 wherein said parking brake lever has substantially the shape of an obtuse triangle and said roller is mounted near the obtuse angle of said triangle.

4. In a block brake unit, as claimed in claim 3 wherein in the release position of the brake unit the connection of said first lever arm, said pivotable mount and said pivotable connection of said transmission lever, are disposed in substantially a first plane; the actuating rod intersecting said first plane at an angle of about 70° and the wedge surface forms an angle with said first plane of about 60°–80°.

5. In a block brake unit as claimed in claim 3 wherein said mechanical parking brake devive comprises a spring-loaded cylinder, the longitudinal axes of said spring-loaded cylinder and said brake piston being substantially at right angles to each other.

* * * * *